United States Patent [19]

Jandera et al.

[11] 4,342,225

[45] Aug. 3, 1982

[54] DEVICE FOR THE INTERNAL INSPECTION OF PIPELINES

[75] Inventors: Jan Jandera; Jan Studnicka, both of Prague, Czechoslovakia

[73] Assignee: Ceske plunarenske pdniky, koncern, Prague, Czechoslovakia

[21] Appl. No.: 204,951

[22] Filed: Nov. 7, 1980

[30] Foreign Application Priority Data

Nov. 23, 1979 [CS] Czechoslovakia ............... 8075-79

[51] Int. Cl.³ .................. G01B 5/28; G01B 21/14
[52] U.S. Cl. .................. 73/432 R; 33/178 E; 33/178 F
[58] Field of Search ............ 73/105, 432 R, 104; 33/125 B, 149 B, 149 J, 178 E, 178 F

[56] References Cited

U.S. PATENT DOCUMENTS 2,398,562  4/1946  Russell ............................. 73/105
4,098,126  7/1978  Howard ........................... 33/178 R
4,227,309 10/1980  Jones ............................... 33/178 R
4,301,677 11/1981  Fisher ............................. 73/105

Primary Examiner—S. Clement Swisher

[57] ABSTRACT

A device for the internal inspection of pipelines under operation, such device sensing and registering the unevenness of the internal pipeline surface on the principal of mechanical-electrical sensing of the internal pipeline cross section. The device is composed of a supporting body to which at least one packing cuff and symmetrically placed displacement sensing elements are attached, the sensing elements having rotatable shafts to which pivoted sensing arms are connected. The arms are in engagement with a weakened cylindrical part of a packing cuff which is disposed about its entire perimeter in contact with the internal pipeline wall. Potentiometric, piezo-electric or other sensing elements are used for transformation of departures of the size of the passage through the pipeline to electrical signals. An evaluating device associated with the inspection device allows selective signal registration from (1) either pair of oppositely sensing elements or (2) the registration of only the displacement found by any pair of sensing elements which is a maximum as compared to the displacement reported by the other pairs of sensing elements. The invention can be applied in the internal inspection of pipelines for gaseous and liquid media by which the device is driven through the pipeline.

12 Claims, 4 Drawing Figures

DEVICE FOR THE INTERNAL INSPECTION OF PIPELINES

The invention relates to a device for the internal inspection of pipelines under operation. The device operates on the principle of mechanical-electrical sensing of the internal pipeline cross section.

The device is composed of a supporting body, a recording device, at least one packing cuff and a plurality of pivoted sensing arms the outer end of which are constantly pressed against the end of the packing cuff which engages the internal wall of the pipeline being inspected. The device determines departures of the internal pipeline cross section from the original rated cross section, for their localization and their registration.

Defects in the cross section geometry of buried pipelines can be determined only by the internal inspection. There are a number of reasons for such internal inspection, as, for example, the measurement of the pipeline passage after its assembly or after it has been cleaned with a cleaning device, or the determination of pipeline deformation caused by the effects of external forces such as earthquakes, landslips and soil shrinkage, or pronounced internal corrosion and abrasion of the pipeline. Pipeline deformation can cause a reduction of flow of a medium through the pipeline, or can damage clean devices, or induce concentrated pipeline stresses which could lead to its fracture or even its breakdown.

The internal inspection of pipelines, especially high-pressure pipelines, is thus a necessary part of the control of the operating conditions of pipelines. Such inspection makes it possible preventively to determine and localize defects and thus to assure the timely repair of the damaged parts of the pipeline.

The internal inspection of long-distance product-pipelines under operation, especially high-pressure pipelines, imposes extraordinary requirements on the construction of the inspection device. Such device should be able to make internal inspections under operating parameters of product-pipelines on long sections with respect to various possibilities of inputs to and outputs from the pipeline. Input and output chambers for the cleaning or inspection devices are usually placed at compressor or pumping stations which are widely spaced, sometimes 100 or more km one from another. This also requires the independence of the section device from an external source of electrical energy; that is why such device must also require a small consumption of electricity.

The flowing medium is used for the movement of the inspection device by the adjustment of the pressure gradient in the pipeline in front of and behind the inspection device. The fluent medium acting on the mechanism of the inspection device presents a number of problems. Because the inspection device should work during its travel over long distances, any appreciable wear of the sensing device, or its damage or even failure, should not take place in order not to make the recorded indications of the internal pipeline cross section erroneous. Sensing elements have to cover esentially the whole perimeter of the pipeline, and not to require excessive complexity and the use of a large number of components. The inspection device should be able to pass not only through curved pipeline sections without indicating departures from normal pipeline cross section, but along the side openings of branched pipelines the sensing elements must be in permanent contact with the pipeline wall over its entire perimeter. Finally, such devices should have sufficient sensitivity to be able to indicate even small alterations in the internal pipeline cross section.

The only one known device for internal inspection which uses pivoted sensing arms for the determination of the uneveness of an internal pipeline surface is disclosed by U.S. Pat. No. 3,755,908. Such device is based on the exclusively mechanical transfer of the positions of the pivoted arms to a recording device. The disadvantage of this device resides in the mechanical lever systems which inevitably have a certain amount of play or backlash, and therefore the results delivered by it are inherently in error to a certain extent, that is, they lack complete sensitivity. Their complete function can also be limited by contamination which may arise under operating conditions. In the inspection of pipelines with liquid products, a further reduction of sensitivity can take place as the result of the necessity of the hermetic packing of the lever systems which extend to the recorder.

The above described disadvantages of the prior art are eliminated by the device for the internal inspection of pipelines according to the present invention. In a preferred embodiment of such device, the device has a supporting body to a rear flange of which there is attached a packing cuff. Symmetrically placed displacement sensing elements are attached by pivot pins to the rear of the supporting body. The packing cuff has the shape of a rearwardly expanding frustum of a cone which terminates at its rear, outer perimeter, in a cylindrical part at the rear end of which the cuff thickness is smaller than the thickness of the other parts of the cuff. The outer, rear ends of the pivoted sensing arms are in constant engagement with the radially inner surface of this weakened cylindrical part of the cuff, which sealing engages the internal pipeline wall over its entire perimeter.

The advantage of the device of the invention lies above all in that there is a direct conversion of the angular displacements of the pivoted sensing arms to electrical signals without the mechanical transfer of the unevenness of the internal surface of the controlled pipeline being inspected. With respect to the small size of the sensing elements, the inspection device can be easily equipped with a large number of equiangularly spaced pivoted sensing arms, so that such arms sense essentially the whole internal perimeter of the pipeline. Since the sensing elements may be hermetically sealed, that is, made gas-tight or liquid-tight, the device according to the invention may be safely used in pipelines carrying an explosive medium or inflammable liquids. The sensitivity of the device in sensing surface unevenesses is not affected by such hermetic sealing of the sensing elements. This hermetically sealed arrangement is also advantageous for the reason that its sensitivity is not impaired by the possible impurities, such as dirt and the like, in the pipeline. The weakening of the cuff at the rear end of its cylindrical part has the advantage that it allows more sensitive transmission of the uneveness of the internal pipeline surface to the pivoted sensing arms, the rear ends of which engage the inner surface of such part of the cuff. This weakening can also be advantageously used with cuffs of shapes other than frusto-conical, if necessary.

In the disclosed preferred embodiment of the invention the displacement sensing elements are made up of potentiometers the fixed contacts of which are connected to a DC source of electric current. The sliding contacts of every pair of diametrically oppositely disposed sensing elements are interconnected through two separating resistors to the inverting input of a feedback operational amplifier. A first output terminal of the amplifier is connected through a diode and a series connected protective resistor to a circuit for the evaluation of maximum displacement of the sensing elements of such pair. The outputs of similar operational amplifiers and diodes for each of the other pairs of sensing elements are connected to the series connected protective resistor in the same way. The first output terminals of all the amplifier-diode combinations are connected in parallel. The input terminal of the protecting resistor, to which all diodes of the circuits for the evaluation of maximum displacement are connected, is connected to the negative pole of the source of electrical current through a resistor for level adjustment. Each operational amplifier for every pair of sensing elements has a second output terminal. A recording device can be selectively connected to the combined output of all of the amplifier-diode combinations, or it can be connected to the second output terminal of any one amplifier. Piezo-electric, capacitance or inductive sensing elements can be used as the sensing elements of displacement in the device of the invention in place of the potentiometers shown.

The advantage of the device of the present invention is the simple and sensitive transformation of the displacement of the pivot arms to an electrical signal which is, as a result of the pair connection of the sensing elements of each opposite pair, proportional to displacements with real unevenness of the internal pipeline surface, and not to parallel displacements of opposite arm pairs which can take place, for example, in a pipeline bend or as a result of other misalignment of the inspection device. The inspection device allows, in the disclosed arrangement, connection of all of the outputs of the operational amplifiers to a multichannel recording device by which the unevennesses of the internal pipeline surface are more accurately localized. Sensing elements of displacement made up of piezo-electric elements, capacitance or inductive elements in non-hermetically sealed versions can also be advantageously employed with explosive media besides hermetically sealed potentiometric sensing elements.

In accordance with one embodiment of the invention the recording device is not placed in the supporting body of the inspection device, but is located in the control station of the product-pipeline. The recording device is connected with the outputs of the operational amplifiers or with the output of the circuit for the evaluation of maximum displacement by means of a transmitting device wherein high frequency electromagnetic waves are transmitted from the inspection device to the control station within the pipeline, which acts as a wave guide for high frequency electromagnetic waves.

A preferred embodiment of the device in accordance with the invention for the internal inspection of pipelines under operation is shown in the accompanying drawings wherein.

Figure 1:
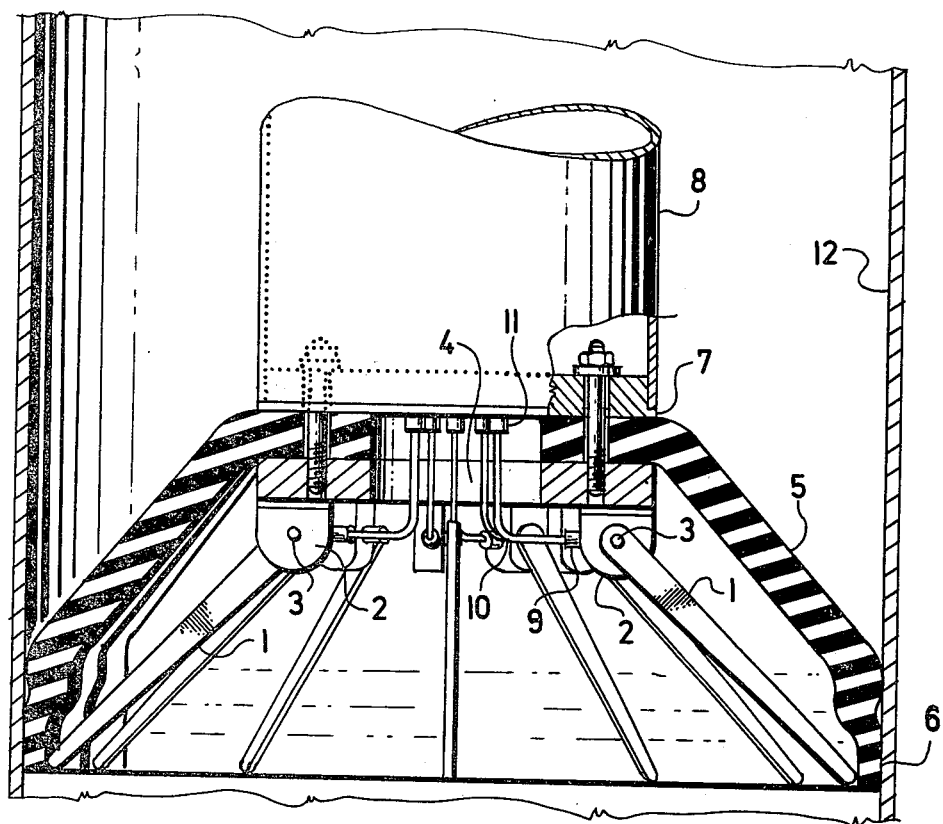
FIG. 1 is a view in longitudinal section of the rear part of the inspection device.

In FIG. 1 there are shown two diametrically opposite sensing arms 1 which are pivotally mounted on the body 8 of the inspection device by stub shafts 3 on the respective sensing elements 2. The outer, rear ends of the pivoted sensing arms 1 are held by torque springs (not shown) in constant engagement with a weakened cylindrical part 6 of a back cuff 5 which in its forward part has the shape of a frustum of a cone the rear end of which at its external perimeter pases into a circular cylindrical part.

Figure 2:
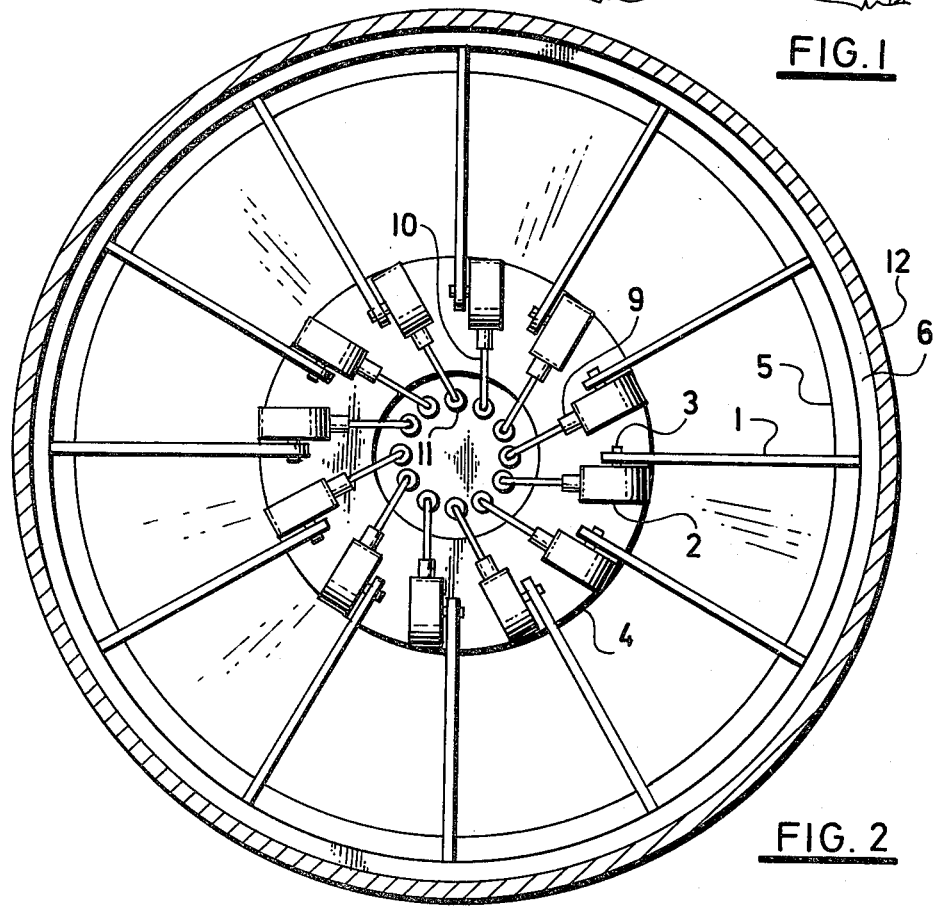
FIG. 2 is an end view of such inspection device in the direction A, from right to left in FIG. 1.

Twelve elements 2 for the sensing of angular displacements of the pivoted sensing arms 1 are attached to the back flange 4 spaced at equal angles about the axis of the device and thus around the entire perimeter of the cuff 5, as can be seen in FIG. 2. In this manner the pivoted sensing arms 1 cover essentially the entire internal perimeter of the pipeline 12. The back flange 4 and a back cover 7 serve to affix the back cuff 5 to the supporting body 8 of the inspection device. In the back part of the cylindrical supporting body 8 there is contained electronic devices including the circuitry shown in FIG. 4. In the middle part of the body 8 there are disposed recording or other registration devices and optionally a high-frequency transmitter for telemetry. A power supply such as a battery is located in the front part of body 8. A front cuff 13 on body 8 (FIG. 3) has a cylindrical part without weakening of its forward periphery; cuff 13 is connected to supporting body 8 by a front flange 18 and a front cover 15.

Cables 10 are fixed by connections 9 to the respective sensing elements 2, such cables passing into the interior of supporting body 8 through electrically insulating bushings 11 in the back cover 7 of the supporting body 8. The cables 10 inwardly of the bushings 11 are connected to the evaluating electronic circuit, shown in FIG. 4, and to a direct current source U such as a battery circuit by the supporting body 8.

Figure 3:
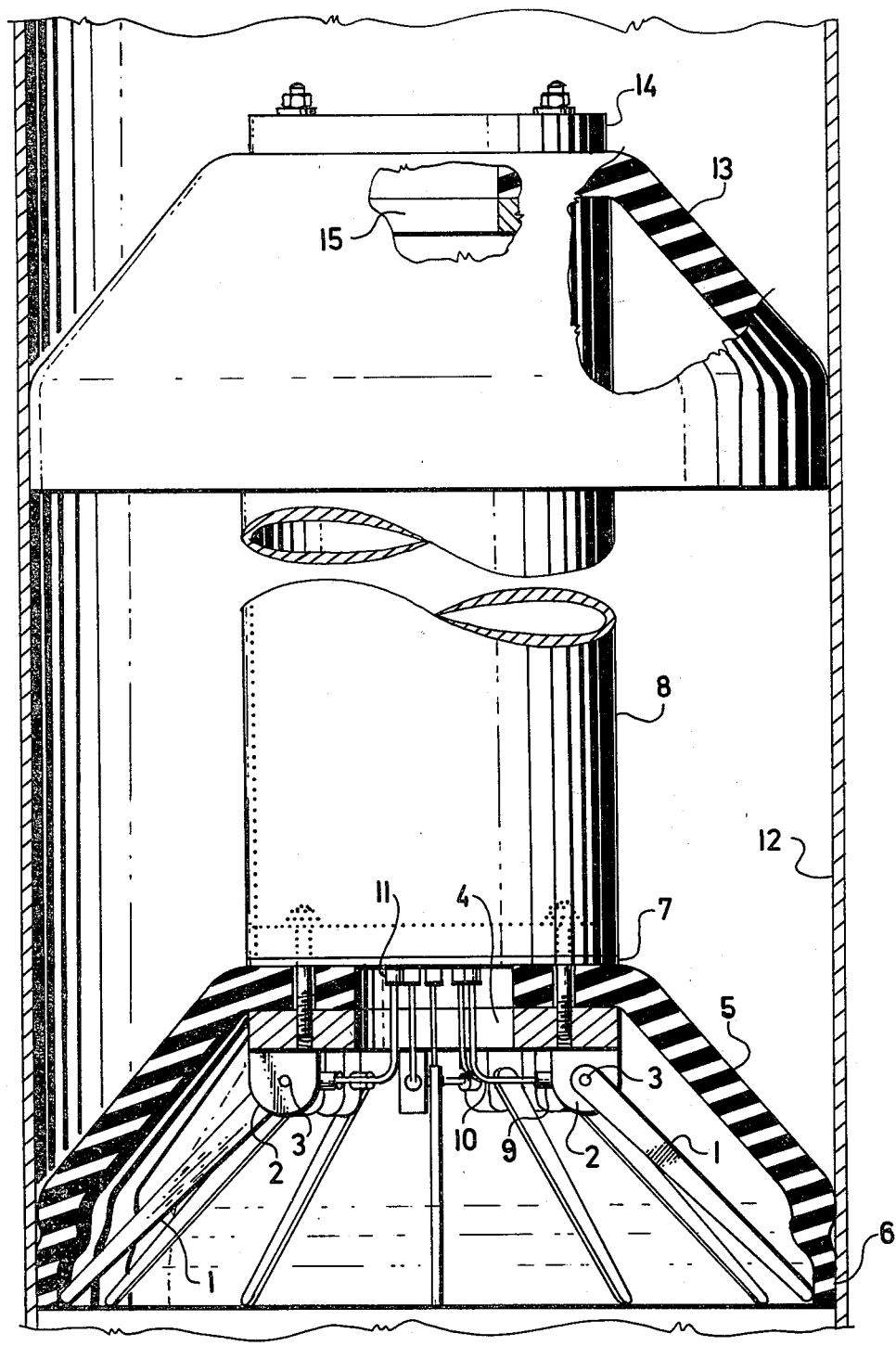
FIG. 3 is a view of the entire inspection device, such view being partially in elevation and partially in longitudinal axial sections.
Figure 4:
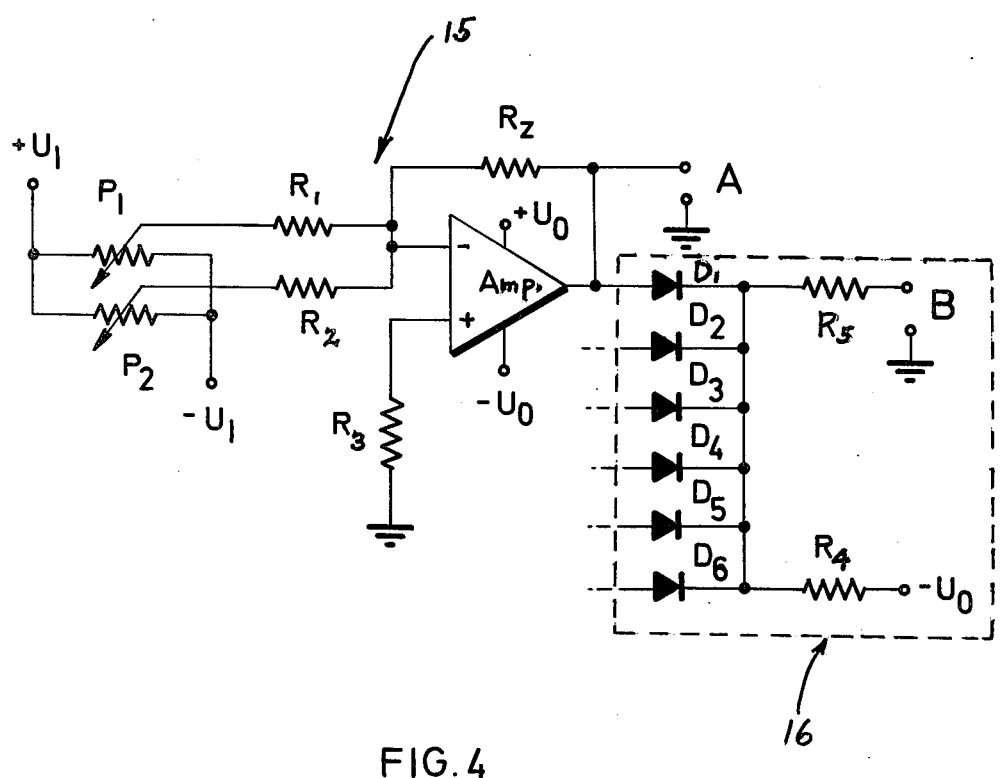
FIG. 4 is a circuit diagram of the evaluating electronic circuit of the inspection device of FIGS. 1, 2 and 3.

Turning now to FIG. 4, there is shown the complete circuitry 15 employed with potentiometers $P_1$ and $P_2$ associated with two opposite sensing arms 1 of the inspection device shown in FIGS. 1, 2 and 3. Circuit 15 has an output A which may be connected to a single track recorder or to one track of a multi-track recorder so as to record the signal from potentiometers $P_1$ and $P_2$ the sliding contacts of which are connected in parallel as shown and connected to the negative input of an amplifier "AMP". The amplifier is powered by a direct current source having negative terminal $-U_0$ and a positive terminal $+U_0$. A first fixed contact of potentiometers $P_1$ and $P_2$ are connected in parallel and to a positive direct current terminal $+U_1$. The second, fixed contacts of the potentiometers are connected in parallel and to the negative terminal $-U_0$ of such current source. The sliding contacts of the potentiometers $P_1$ and $P_2$ are connected respectively through resistors $R_1$ and $R_2$ to the negative input of the amplifier. The positive input of the amplifier is connected to the ground of the electronic circuit through a resistor $R_3$. The output of the amplifier is connected a first terminal of output A, the second terminal of such output A is connected to the negative input of the amplifier through a feedback resistor $R_z$.

The portion 16 of the circuit includes six diodes $D_1$–$D_6$ the outputs of which are connected in parallel. The inputs of each such diode are connected to the outputs of five additional amplifiers in circuits which are the same as that of circuit 15, such additional circuits being operatively associated with the five other pairs of opposed sensing arms 1. It is to be understood that each of such five additional circuits has an output corresponding to output A connected thereto, whereby the outputs from each of the five additional circuits may also be individually recorded at outputs similar to output A. In circuit part 16 a second output B has one terminal thereof connected to ground and the other terminal connected through a protective resistor $R_5$ to the parallel connected outputs of the diodes $D_1$–$D_6$. The combined output of the diodes is connected through a resistor $R_4$ for level adjustment to the negative terminal $-U_0$ of the current supply.

The above described inspection device operates as follows: The body 8 of the device is disposed at the axis of the pipeline 12 by means of the front cuff 13 and the back cuff 5, the perimeters of such cuffs tightly fitting the internal wall of the pipeline 12. The walls of the cuffs 5 and 13 are sufficiently hard and elastic to engage the internal wall of the pipeline with sufficient force to prevent leakage of the fluid in the pipeline therebetween. The cuffs are sufficiently stiff to prevent their deformation as a result of the weight of the body 8 and its contents. The weakened cylindrical part 6 of the back cuff 5, which yieldably engages the inner wall of the pipeline 12, makes possible a sensitive transfer of unevennesses and cross section alterations of the pipeline 12 to the pivoted sensing arms 1 which are constantly supported by such part 6 of the back cuff 5. This also prevents any appreciable wear of the outer ends of the arms 1 by reason of their traveling along the inner surface of the pipeline.

Alterations in the position of the pivoted sensing arms 1 induced by unevennesses of the internal wall of the pipeline 12 are carried through the rotating pins or sub-shafts 3 of sensing elements 2 to the sliding contacts thereof by which they are transformed to analog electrical quantities proportional to the value or size of the displacement.

The sensing elements 2 of two oppositely placed sensing arms 1 are electrically connected in a differentiating circuit in order to record only the net changes in the pipeline cross section. The potentiometric sensing elements $P_1$ and $P_2$ are controlled by the pair of oppositely placed pivoted sensing arms 1 in such a way that rotation of the arms 1 move the sliding contact of the associated potentiometer connected thereto. The output voltages on the sliding contacts of the potentiometric sensing elements $P_1$ and $P_2$ are led to the inverting or negative input of the amplifier on the output A of which voltage appears which is proportional to the algebraic sum of the displacements of the two arms connected to the potentiometers $P_1$ and $P_2$. Outputs A allow the multi-track recordation from single pairs of pivoted sensing arms 1, and by that the accurate localization of changes in the cross section in the pipeline 12 around its periphery. In the case of a one-track record of the maximum displacement of a pair of pivoted sensing arms 1, it is possible to connect the output A of the operational amplifier to the circuit 16 for the evaluation of maximum displacement. This circuit causes the highest of the voltages on the outputs of single connected amplifiers to appear on output B of the circuit 16. The output voltage at either output A or output B is recorded either graphically or magnetically by a recording device disposed in the supporting body 8 of the inspection device or such voltage can also be telemetrically transmitted by using a high-frequency transmitter disposed in the supporting body 8 by employing the pipeline 12 itself as a wave guide.

The inspection device according to the invention can be used for performing internal inspections of product-lines under operation with all product-lines of larger diameters equipped with chambers for the insertion thereinto and removal therefrom of cleaning and inspection devices.

Although the invention is illustrated and described with reference to a plurality of preferred embodiments thereof, it is to be expressly understood that it is in no way limited to the disclosure of such a plurality of preferrred embodiments, but is capable of numerous modifications within the scope of the appended claims.

We claim:

1. A device for the inspection of the internal cross section of pipelines under operation, comprising a supporting body adapted to be introduced into the pipeline, a recording device, at least one packing cuff on the supporting body, and a plurality of sensing arms pivotally mounted upon the supporting body, the outer ends of the sensing arms constantly engaging the internal periphery of the portion of the packing cuff which engages the internal surface of the pipeline, and a plurality of displacement sensing elements attached to the supporting body, each of such sensing elements having a stub-shaft to which the inner end of a respective sensing arm is connected, whereby rotation of the sensing arm similarly rotates the stub shaft of the sensing element.

2. A device according to claim 1, wherein the cuff is in the shape of a frustum of a cone which expands outwardly from the supporting body to an outer perimeter which is adjacent to and engages the inner wall of the pipeline, the end of the cuff engaging the pipeline having a radial thickness which is smaller than the thickness of the other parts of the cuff, the outer ends of the pivot sensing arms being in constant engagement with the internal wall of such cylndrical part of the cuff which is of lesser wall thickness than the other parts of the cuff.

3. A device according to claim 1, wherein the displacement sensing elements are potentiometers which are electrically connected by their fixed contacts to a source of direct current and the sliding contacts of each pair of two oppositely disposed sensing elements are interconnected through respective separating resistors, an operational amplifier having a negative inverting input, such negative input being connected to the outputs of said two separating resistors connected in parallel, the amplifier having an output terminal which may be selectively connected to said recording device.

4. A device according to claim 3, comprising a diode connected to the output of each of the amplifiers associated with each pair of oppositely disposed sensing arms, circuit means connecting the outputs of all of said diodes together and a second output terminal, circuit means connecting the parallel connected outputs of the diodes to said second output terminal, and wherein the recorder includes means for recording only the output of that pair of potentiometers and its associated amplifier which are operatively connected to the pair of oppositely disposed sensing arms which are subjected to the maximum relative displacement.

5. A device according to claim 4, comprising a protecting resistor to which the outputs of the operational amplifiers of all the other pairs of sensing elements of displacement are connected in the same way, and circuit means connected to the negative pole of the source of supply current through a further resistor or level adjustment.

6. A device according to claim 1, wherein the sensing elements are made of piezo-electric elements.

7. A device according to claim 1, wherein the sensing elements of displacement are made up of capacitance elements.

8. A device according to claim 1, wherein the sensing elements of displacement are made up of inductive elements.

9. A device according to claim 3, wherein the output of the amplifier for each pair of displacement sensing elements is connected to a separate input of a recording device.

10. A device according to claim 9, wherein the recording device is connected to a circuit for the evaluation of the maximum displacement of that pair of sensing elements which are instantaneously displaced to a maximum extent.

11. A device according to claim 1, wherein the recording device is disposed in a controlled station of the pipeline, and the recording device is connected with the output of the amplifiers by means of a transmitting device.

12. A device according to claim 11, wherein the recording device is connected with the outputs of the operational amplifiers by means of high-frequency electromagnetic waves which are transmitted by the inspection device to the recording device through the pipeline acting as a wave guide.

* * * * *